United States Patent
Ludin et al.

(10) Patent No.: US 11,146,615 B2
(45) Date of Patent: Oct. 12, 2021

(54) MULTI-DOMAIN CONFIGURATION HANDLING IN AN EDGE NETWORK SERVER

(71) Applicant: Akamai Technologies, Inc., Cambridge, MA (US)

(72) Inventors: Stephen L. Ludin, San Mateo, CA (US); Prasanna Laghate, San Mateo, CA (US); Matthew J. Stevens, Lexington, MA (US); Frederick R. Shotton, Piedmont, CA (US); Jozef Hatala, San Mateo, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

(21) Appl. No.: 16/371,173

(22) Filed: Apr. 1, 2019

(65) Prior Publication Data
US 2019/0230143 A1    Jul. 25, 2019

Related U.S. Application Data

(63) Continuation of application No. 15/707,493, filed on Sep. 18, 2017, now Pat. No. 10,250,667, which is a continuation of application No. 13/666,068, filed on Nov. 1, 2012, now Pat. No. 9,769,238.

(60) Provisional application No. 61/554,571, filed on Nov. 2, 2011.

(51) Int. Cl.
G06F 15/16 (2006.01)
H04L 29/08 (2006.01)
H04L 29/12 (2006.01)

(52) U.S. Cl.
CPC .......... H04L 67/02 (2013.01); H04L 61/1511 (2013.01); H04L 67/1008 (2013.01)

(58) Field of Classification Search
CPC . H04L 61/1511; H04L 67/02; H04L 67/1008; H04L 61/305; H04L 61/30;
(Continued)

(56) References Cited

U.S. PATENT DOCUMENTS

| 6,338,082 B1 * | 1/2002 | Schneider | H04L 29/12594 709/203 |
| 7,343,397 B2 * | 3/2008 | Kochanski | G06Q 30/06 709/203 |

(Continued)

FOREIGN PATENT DOCUMENTS

WO    WO-2020209703 A1 * 10/2020    .......... H04L 67/2838

OTHER PUBLICATIONS

A Blockchain based Dual side Privacy preserving Multi party Computation Scheme for Edge enabled Smart Grid Zhitao Guan;Xiao Zhou;Peng Liu;Longfei Wu;Wenti Yang IEEE Internet of Things Journal (Year: 2021).*

*Primary Examiner* — Oscar A Louie
*Assistant Examiner* — Oluwatosin M Gidado
(74) *Attorney, Agent, or Firm* — David H. Judson

(57) ABSTRACT

An Internet infrastructure delivery platform operated by a provider enables HTTP-based service to identified third parties at large scale. The platform provides this service to one or more cloud providers. The approach enables the CDN platform provider (the first party) to service third party traffic on behalf of the cloud provider (the second party). In operation, an edge server handling mechanism leverages DNS to determine if a request with an unknown host header should be serviced. Before serving a response, and assuming the host header includes an unrecognized name, the edge server resolves the host header and obtains an intermediate response, typically a list of aliases (e.g., DNS CNAMEs). The edge server checks the returned CNAME list to determine how to respond to the original request. Using just a single edge configuration, the CDN service provider can support instant provisioning of a cloud provider's identified third party traffic.

8 Claims, 3 Drawing Sheets

(58) Field of Classification Search
CPC . H04L 31/3015; H04L 61/3055; H04L 31/35;
H04L 61/6004; G06F 17/30861
USPC ........................................................ 709/217
See application file for complete search history.

(56) References Cited

U.S. PATENT DOCUMENTS

| | | | | |
|---|---|---|---|---|
| 2002/0010776 | A1* | 1/2002 | Lerner | H04L 63/0815 |
| | | | | 709/225 |
| 2005/0044151 | A1* | 2/2005 | Jiang | G06F 9/546 |
| | | | | 709/206 |
| 2005/0234921 | A1* | 10/2005 | King | G06F 16/958 |
| 2005/0278259 | A1* | 12/2005 | Gunaseelan | G06Q 10/10 |
| | | | | 705/59 |
| 2007/0250560 | A1* | 10/2007 | Wein | H04L 67/1008 |
| | | | | 709/201 |
| 2010/0125895 | A1* | 5/2010 | Shull | H04L 63/08 |
| | | | | 726/4 |
| 2010/0274668 | A1* | 10/2010 | Langston | G06Q 30/0257 |
| | | | | 705/14.55 |
| 2010/0274970 | A1* | 10/2010 | Treuhaft | H04L 61/1511 |
| | | | | 711/118 |
| 2011/0225206 | A1* | 9/2011 | Sureshchandra | H04L 29/12066 |
| | | | | 707/802 |
| 2013/0111066 | A1* | 5/2013 | Vempati | H04L 61/1511 |
| | | | | 709/245 |

* cited by examiner

MULTI-DOMAIN CONFIGURATION HANDLING IN AN EDGE NETWORK SERVER

BACKGROUND OF THE INVENTION

Technical Field

This application relates generally to delivery online of content from multiple content provider domains using a shared infrastructure.

Brief Description of the Related Art

Distributed computer systems are well-known in the prior art. One such distributed computer system is a "content delivery network" or "CDN" that is operated and managed by a service provider. The service provider typically provides the content delivery service on behalf of third parties (customers) who use the service provider's infrastructure. A distributed system of this type typically refers to a collection of autonomous computers linked by a network or networks, together with the software, systems, protocols and techniques designed to facilitate various services, such as content delivery, web application acceleration, or other support of outsourced origin site infrastructure. A CDN service provider typically provides service delivery through digital properties (such as a website), which are provisioned in a customer portal and then deployed to the network. A digital property typically is bound to one or more edge configurations that allow the service provider to account for traffic and bill its customer.

Cloud computing is a model of service delivery for enabling on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications). Users of cloud-based services have come to expect an "instant-on, no-waiting, do-it-yourself" experience that is controllable, open, and paid for on an "as used" basis. Due to this ease of use, a single cloud service customer (e.g., a website hosting provider) may provision hundreds or even thousands of third party digital properties using the cloud provider's "do-it-yourself" configuration mechanisms.

Cloud providers desire to use CDN service providers to provide cloud customers with a better overall performance for their websites. The existing configuration models for these businesses, however, are not aligned, because the $2^{nd}$ party model used by the CDN service provider (wherein the CDN customer is billed for traffic) does not easily accommodate the third party model associated with the cloud provider (wherein the cloud usage often applies to multiple third parties). Stated another way, the various digital properties that use the cloud services are not customers of the CDN. Yet, the CDN service provider (and, in particular, its edge configurations) must be aware of these third party digital properties if the CDN is to deliver them properly.

BRIEF SUMMARY

An Internet infrastructure delivery platform operated by a service provider enables HTTP-based service delivery to identified third parties at large scale. The platform provides this service to one or more cloud providers (the platform customers), who encapsulate the HTTP service (IaaS, PaaS and SaaS) as special digital properties. The approach enables the CDN platform provider (the first party) to service third party traffic on behalf of the cloud provider (the second party).

The delivery platform operates a plurality of edge server machines at Internet-accessible locations. End user clients (e.g., browsers or other user agents) are directed to these edge server machines to obtain content. Typically, an end user request is an HTTP GET request that includes one or more host headers. According to this disclosure, an edge server handling mechanism leverages DNS (domain name services) to determine if a request with an unknown host header should be served by the edge server. Before serving the request and assuming the host header includes an unrecognized name, the edge server resolves the host header and obtains an intermediate response, typically a list of aliases (e.g., DNS canonical names or "CNAMEs"). The edge server then checks the returned CNAME list to determine how to respond to the original request. Using this mechanism and just a single edge configuration, the CDN service provider can support instant provisioning of a cloud provider's identified third party traffic.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the disclosed subject matter and the advantages thereof, reference is now made to the following descriptions taken in conjunction with the accompanying drawings, in which.

DETAILED DESCRIPTION

Figure 1:
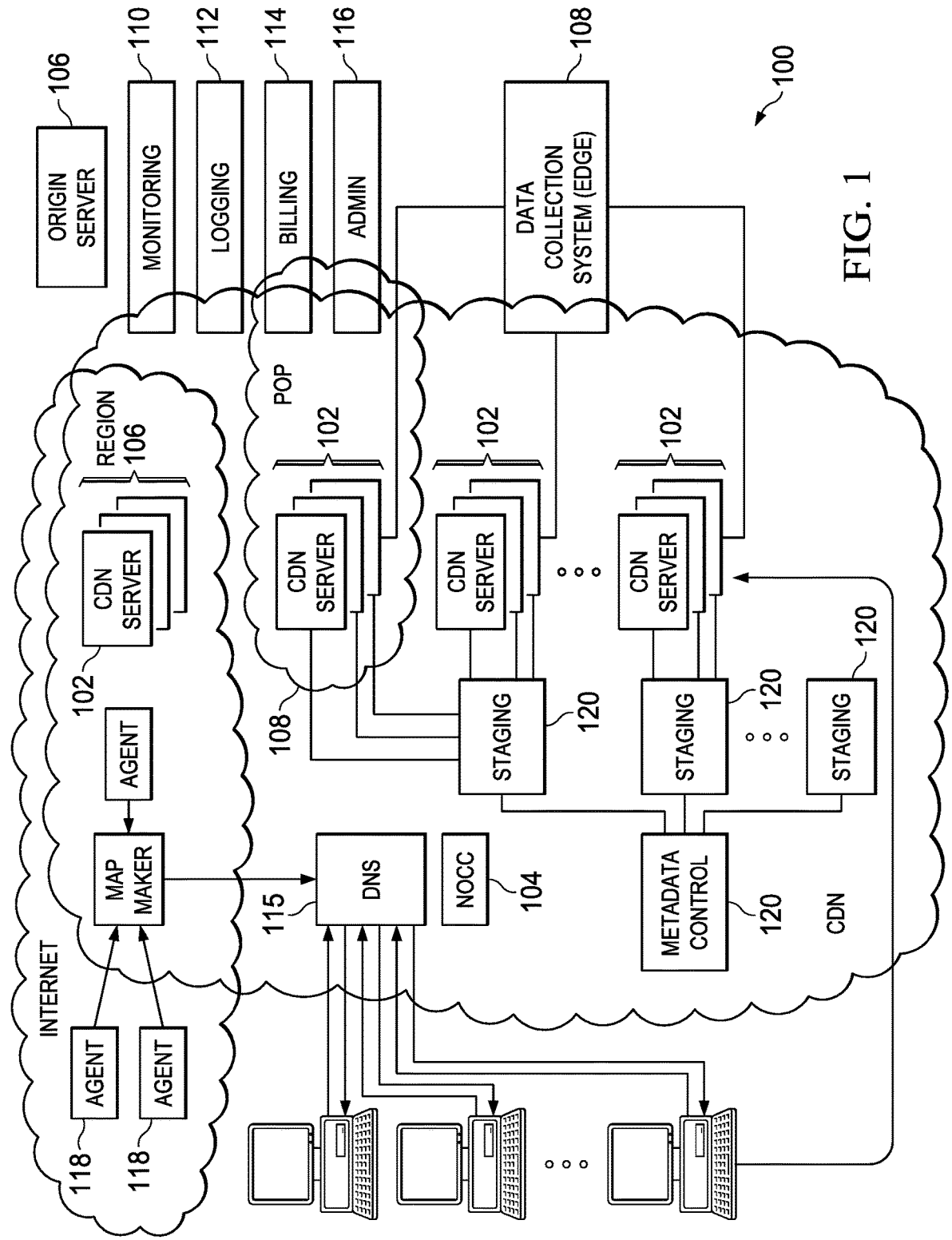
FIG. 1 is a block diagram illustrating a known distributed computer system configured as a content delivery network (CDN)

FIG. 1 illustrates a known distributed computer system that (as described below) is extended by the techniques herein to provide a single HTTP-based platform with the ability to deliver online HD video at broadcast audience scale to the most popular runtime environments and to the latest devices in both fixed line and mobile environments.

In a known system, such as shown in FIG. 1, a distributed computer system 100 is configured as a CDN and is assumed to have a set of machines 102a-n distributed around the Internet. Typically, most of the machines are servers located near the edge of the Internet, i.e., at or adjacent end user access networks. A network operations command center (NOCC) 104 manages operations of the various machines in the system. Third party sites, such as web site 106, offload delivery of content (e.g., HTML, embedded page objects, streaming media, software downloads, and the like) to the distributed computer system 100 and, in particular, to "edge" servers. Typically, content providers offload their content delivery by aliasing (e.g., by a DNS CNAME) given content provider domains or sub-domains to domains that are managed by the service provider's authoritative domain name service. End users that desire the content are directed to the distributed computer system to obtain that content more reliably and efficiently. Although not shown in detail, the distributed computer system may also include other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the edge servers.

Figures 2, 3:
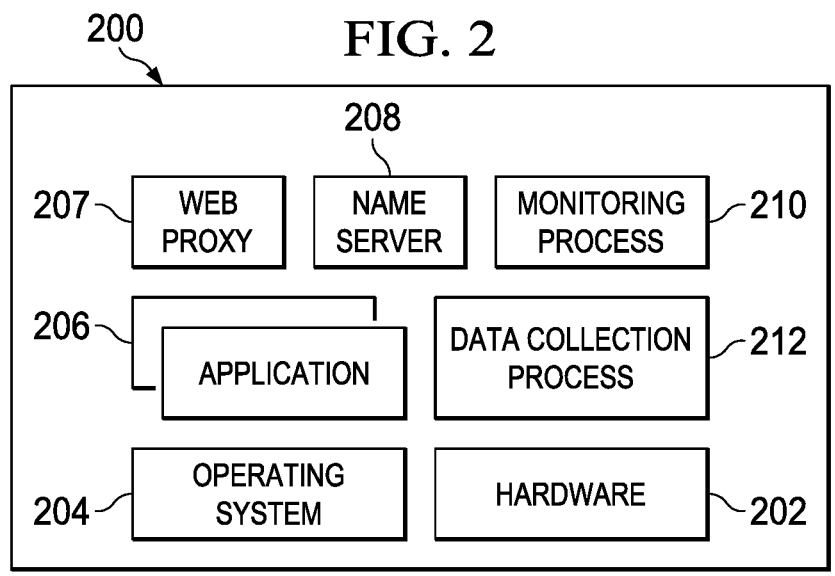
FIG. 2 is a representative CDN edge machine configuration.
FIG. 3 illustrates how various digital properties are associated to one another using the approach described herein.

As illustrated in FIG. 2, a given machine 200 comprises commodity hardware (e.g., an Intel Pentium processor) 202 running an operating system kernel (such as Linux or variant) 204 that supports one or more applications 206a-n. To facilitate content delivery services, for example, given machines typically run a set of applications, such as an HTTP proxy 207 (sometimes referred to as a "global host" or "ghost" process), a name server 208, a local monitoring process 210, a distributed data collection process 212, and the like. For streaming media, the machine typically includes one or more media servers, such as a Windows Media Server (WMS) or Flash server, as required by the supported media formats.

A CDN edge server is configured to provide one or more extended content delivery features, preferably on a domain-specific, customer-specific basis, preferably using configuration files that are distributed to the edge servers using a configuration system. A given configuration file preferably is XML-based and includes a set of content handling rules and directives that facilitate one or more advanced content handling features. The configuration file may be delivered to the CDN edge server via the data transport mechanism. U.S. Pat. No. 7,111,057 illustrates a useful infrastructure for delivering and managing edge server content control information, and this and other edge server control information can be provisioned by the CDN service provider itself, or (via an extranet or the like) the content provider customer who operates the origin server.

The CDN may include a storage subsystem, such as described in U.S. Pat. No. 7,472,178, the disclosure of which is incorporated herein by reference.

The CDN may operate a server cache hierarchy to provide intermediate caching of customer content; one such cache hierarchy subsystem is described in U.S. Pat. No. 7,376,716, the disclosure of which is incorporated herein by reference.

The CDN may provide secure content delivery among a client browser, edge server and customer origin server in the manner described in U.S. Publication No. 20040093419. Secure content delivery as described therein enforces SSL-based links between the client and the edge server process, on the one hand, and between the edge server process and an origin server process, on the other hand. This enables an SSL-protected web page and/or components thereof to be delivered via the edge server.

As an overlay, the CDN resources may be used to facilitate wide area network (WAN) acceleration services between enterprise data centers (which may be privately-managed) and third party software-as-a-service (SaaS) providers.

In a typical operation, a content provider identifies a content provider domain or sub-domain that it desires to have served by the CDN. The CDN service provider associates (e.g., via a canonical name, or CNAME) the content provider domain with an edge network (CDN) hostname, and the CDN provider then provides that edge network hostname to the content provider. When a DNS query to the content provider domain or sub-domain is received at the content provider's domain name servers, those servers respond by returning the edge network hostname. The edge network hostname points to the CDN, and that edge network hostname is then resolved through the CDN name service. To that end, the CDN name service returns one or more IP addresses. The requesting client browser then makes a content request (e.g., via HTTP or HTTPS) to an edge server associated with the IP address. The request includes a host header that includes the original content provider domain or sub-domain. Upon receipt of the request with the host header, the edge server checks its configuration file to determine whether the content domain or sub-domain requested is actually being handled by the CDN. If so, the edge server applies its content handling rules and directives for that domain or sub-domain as specified in the configuration. These content handling rules and directives may be located within an XML-based "metadata" configuration file.

Multi-Domain Configuration Handling

With the above as background, the subject matter of this disclosure is now described. As noted above, the Multiple Domain Configuration (MDC, or mdc) feature allows for unlimited numbers of domains (e.g., typically associated with or owned by third parties) to be supported by a single configuration (associated with a second party) in a scalable way. In a representative but non-limiting embodiment, the second party is a cloud services provider, and the first party is the CDN platform service provider that operates the distributed network such as shown in FIG. 1. As described, the edge server machines 102 provide a handling mechanism that implements the functionality described below.

As used herein, the following provides a glossary of relevant terms.

The term "MDC" refers to the name of the service feature, or "multi-domain configuration," which is a service that allows an edge server configuration file to support a large number of hosts (and hostnames) by performing a DNS lookup that leads to the actual host (hostnames) used to lookup an appropriate content handling metadata file for a particular request.

An "Intermediate Pattern" is the DNS response returned from the resolution of an unrecognized hostname in a host header. Typically, an intermediate pattern is considered to be a valid response if it has a certain format, e.g., config_name.mdc.service.net, where config_name is the host header (digital property) that will be used eventually to lookup up the content handling metadata file.

A "config_host name" refers to the config_name section of the intermediate response.

A "Host CNAME chain" is the DNS response returned from the resolution of the hostname in the host header.

A "Proxy Host CNAME chain" is the DNS response returned from the resolution of the hostname in the host header combined with a prefix of "proxy-host." The DNS response can include intermediate CNAME aliases that contain metadata available to the content handling metadata file for extraction. This DNS response is the one used by the MDC feature for determining the config_host name and other information (e.g., a hostname-to-IP address map). The usage of a prefix provides a way to prevent denial-of-service when changing DNS records to move a digital property (e.g., a web site) to or from a CDN provider.

As noted above, MDC enables CDN customers who operate SaaS-based solutions (including site hosting) to use the CDN service offerings while at the same time enabling the CDN provider to capture and appropriately bill its customer (the provider of the SaaS-based solution) appropriately for the third party traffic. This feature is easy to integrate, as it only requires specific domains to be CNAME'd into a per configuration common domain. As will be seen, MDC allows a CDN customer to map a large number of unique domains to a single configuration file without changing their configuration. This simplifies provisioning, makes authentication easier, and improves performance for users while significantly reducing management overhead.

In general, the technique works as follows. When a CDN customer such as XYZ.com activates MDC, it enables XYZ.com to map a large number of unique domains such as Cust1.saas.XYZ.com, Cust2.saas.XYZ.com to a single configuration file. FIG. 3 illustrates the multi-party identity assertion approach of this disclosure, wherein the CDN customer is the second party that has the business arrangement with the CDN service provider (the first party), and where the second party has separate business arrangements with each of its customers (the third parties). On activation, the CDN edge servers cache the full Canonical Name (CNAME) chain of request's host header (example: www.Cust1.com) and bind the request to the correct configuration file. Thereafter the requests resolve to the appropriate CDN edge server network IP address. The Request is then processed and end users are served.

FIG. 3 illustrates the multi-party identity assertion (CNAME chain) approach of this disclosure, wherein the CDN customer is the second party that has the business arrangement with the CDN service provider (the first party), and where the second party has separate business arrangements with each of its customers (the third parties).

Optionally, labels from the DNS records of the CNAME chain can be referenced in the configuration to support security validation and application origin routing. An advantage of this approach is the cloud provider's origin is offloaded from performing this operation centrally, making the overall application delivery process more efficient.

The approach provides many benefits. A first benefit is easier management. The technique provides a scalable way to put unlimited domains on the CDN with a single configuration for instant provisioning. No additional configuration changes are needed for new additional domains as they are added by the second party. The technique also provides enhanced security at the edge network, as intelligent edge configurations can leverage data from the full CNAME chain for identity/security binding at the edge using simple trust models, thus achieving security offload for the origin. The technique also provides the second party customer better performance. The intelligent edge configurations leverage data from the full CNAME chain for resource binding and conditional processing, improving overall performance and also aiding in origin offload.

Figure 4:
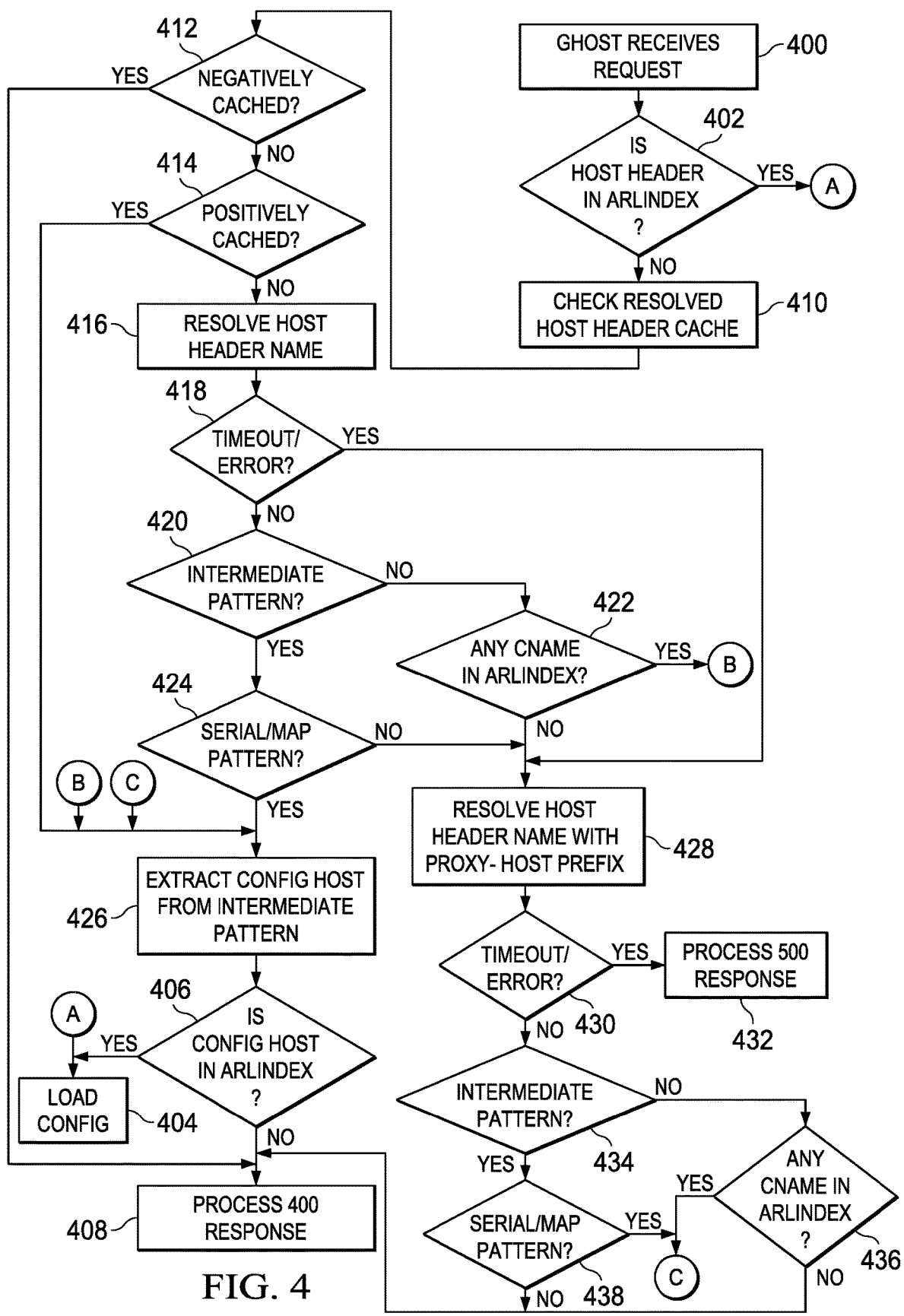
FIG. 4 illustrates a detailed operating flow in an edge server handling mechanism according to an embodiment of this disclosure.

In one implementation, the multi-domain configuration function operates at an edge server in a CDN edge network. It provides a means to support a binding between an unknown Host header (received at the edge server with a client browser GET request), and a customer configuration file that may (or may not be) supported there. When no customer configuration is found, a DNS lookup is performed on the host header value, and a resulting CNAME chain is analyzed to determine which (if any) customer configuration to use. Positive and negative DNS lookups may be cached. FIG. 4 illustrates the process in detail.

Preferably, MDC leverages DNS to determine if a request with an unknown host header should be served by the edge server ghost (web proxy) process. Before serving the request, and assuming a match to the host header is not found in the server's configuration file, the unknown host header is resolved. The process then examines the returned CNAME list to check if and how the request should be served. The following is an example of this process.

Assume a customer (foo.com) CNAMEs its hosts over to a new CDN edge domain as such:

www.odddomain.com. IN CNAME cfg.foo.com.mdc.edgesuite.net. www.anotherdomain.com. IN CNAME cfg.foo.com.mdc.edgesuite.net. and cfg.foo.com.mdc.edgesuite.net in turn is resolved to a CDN-specific map, such as ax.s.akamaiedge.net, where x is a CDN serial number assignment (for load balancing) and s is an optional special map for this traffic. The nomenclature used for the CDN-specific map is not intended to be limiting, as particular providers typically use different schemes. With this setup, preferably the operating flow is as follows. First, an end user client machine (or a local DNS associated therewith) resolves www.odddomain.com to an IP address and sends the request. Typically, the IP address is associated with a specific ghost process executing on a particular edge server machine that is close to the end user, not overloaded, and that is expected to host the desired content. The ghost (the web proxy) process receives the request and extracts the host header. The ghost process then looks up the host in its configuration file (called arlindex in this example), typically represented as XML. If the host header value if found, normal processing occurs. If not, the flow preferably continues as follows. In particular, the ghost process performs a DNS resolution of the host header name. The returned CNAMEs are then examined for two patterns. First, and given the example scenario, the ghost process looks for the *.mdc.edgesuite.net pattern. As noted above, this pattern is also called the config_host name. Ghost then looks for the aX.s.akamaiedge.net map (or another CDN-recognizable serial/map pattern). If the ghost process then finds the traffic is mapped to a valid CDN serial/map, it uses config_host name to perform another configuration file lookup for the metadata file associated therewith. Now, assuming resulting metadata file is loaded, the request is then processed by ghost process as normal (meaning that the content handling requirements identified in the metadata file are applied to the requested content and the content is served). Any failure triggers "unknown host" logic in ghost, which then takes control. Note that this behavior preferably is not recursive; thus, a second failed lookup in the configuration file does not result in attempting a new DNS resolution of the unknown hostname.

The above-described procedure adds some time to the response for an MDC request. To mitigate this, preferably the ghost process caches positive and negative lookups. Positive lookups may be cached according to a time-to-live (TTL) returned in the DNS response from the customer's name server. Preferably, negative (NX) responses are cached for a given time (e.g., 30 minutes) by default. Error responses, such as timeouts, preferably are not cached. For positive responses, preferably the hostname (and CNAME aliases) used to lookup metadata are cached. A dedicated cache may be used for this purpose.

This flow is extremely flexible for the customer, as it requires no CDN pre-knowledge of the hostnames that will be served, and it can easily scale to any number of host names.

FIG. 4 illustrates an example edge server logic flow in more detail. The flow begins at step 400 when ghost receives the HTTP GET with the host header. At step 402, ghost tests to determine whether the host header is found in its index. This index normally includes host headers identifying all of the digital properties being served by this particular edge configuration (which may include all CDN customers or some subset thereof). If the host header is recognized, normal processing continues at step 404 with ghost loading the edge configuration for the recognized domain (digital property). The content is then served in the usual manner (after applying any content handling requirements identified in the edge configuration). If, however, the outcome of the test at step 402 indicates that the host header in the GET request is not recognized, the routine branches to step 410, wherein ghost checks its host header cache to see if it has resolved this host header before. The routine then continues at step 412 to see if any such result is negatively cached. If so, the routine branches to step 408 and issues an HTTP 400 (bad request) and the process ends. If a prior resolution and has been found and is not positively cached as indicated by the test at step 414, the routine then branches to step 416 to attempt to resolve the host header name. Step 416 is the basic operation (the resolution of the unknown "host header") via DNS as described above.

At step 416, ghost resolves the unknown host header. A test is performed at step 418 to ensure that the resolution does not take too long. If the resolution at step 416 occurs within the timeout period, control continues at step 420 to determine whether the result of the resolution (typically one or more CNAMES) is recognized as an intermediate pattern. If the result is not recognized as an intermediate pattern, the routine continues at step 422 to test whether a CNAME in the response (from step 416) is found in the host header configuration file. If so, the routine branches to step 426 to extract config_host name. After step 426, control continues at step 406 to determine whether the extracted config_host name is found in the edge server host header configuration file. If the outcome of the test at step 406 indicates that the config_host name is found in the index file, control continues at step 404, with the edge server applying any content handling requirements and serving the response. Otherwise, control process to step 408 and ends with an HTTP 400 as previously described.

If the outcome of the test at step 420 indicates that an intermediate pattern has been recognized, ghost performs a test at step 424 to determine whether the response (returned at step 416) has a recognized serial/map pattern. If so, control continues at step 426, as has been described.

If the outcome of step 418 is positive, or if the outcome of step 422 or step 424 is negative, control continues at step 428. At this step, ghost resolves the host header name with the proxy-host prefix. As noted above, the usage of the prefix provides a way to prevent denial-of-service when changing DNS records to move a digital property (e.g., a web site) to or from a CDN provider. The result of the solution at step 428 is then passed through a set of operations (steps 430, 434 and 438) that mirror those in steps (418, 420 and 424), with the exception that a positive response to the timeout test at step 430 generates an HTTP 500 code (because recursion is not used). This completes the processing.

Migration Options

Typically, there are several MDC migration options when a customer is using another provider: a second party migration option, and a third party migration option. A second party option is a scenario is which a second party represents the DNS authority for a number of third party websites that will CNAME to them. When the second party CNAME's over to a CDN, all third party websites are moved at the same time. The third party scenario is where a third party represents a website that CNAME's its host to a second party provider.

A solution to the second party scenario is as follows. First, perform a DNS lookup on the host header. Assume that there is a failure to find one of the mdc suffixes. For every CNAME returned back in the DNS lookup, ghost then determines if the CNAME exists in the edge server host header configuration file. If the CNAME does exist in the configuration file, and for each mdc suffix, ghost appends the mdc suffix to the CNAME and checks again if the result exists in the host header configuration file. If it does, this outcome indicates an mdc customer. Then, the hostname constructed from the CNAME and mdc suffix is used to look-up the serial/map that is then applied to the request.

The following is an example. Assume that CDN customer hosts images.example.com and that it desires to migrate to the CDN. The old DNS CNAME chain may be:
c321.s21.cdn2.cpcloud.com a8.cdn.ccloud.com
a8.cdn.cpcloud.com.sp.net Based on the migration, the new DNS CNAME Chain might then be as follows:
c321.s21.cdn2.cpcloud.com a8.cdn.cpcloud.com
a8.cdn.cpcloud.com.mdc.edgesuite.net
a8.s.akamaiedge.net With the old DNS CNAME chain, ghost may find a8.cdn.cpcloud.com in its host header index, append mdc.edgesuite.net and find a8.cdn.cpcloud.com.mdc.edgesuite.net also in the index. Then, the server uses a8.cdn.cpcloud.com.mdc.edgesuite.net to find the serial/map whose configuration is then ultimately applied to the received request.

To facilitate a third party migration scenario, a specialized prefix such as proxy-host is used to do the lookup. In this case, the customer CNAMEs two hostnames, e.g.:
proxy-host.www.odddomain.com. IN CNAME cfg.foo.com.mdc.edgesuite.net.
www.odddomain.com. IN CNAME cfg.foo.com.mdc.edgesuite.net.
cfg.foo.com.mdc.edgesuite.net. IN CNAME aX.s.akamaiedge.net.

As long as the proxy-host.www.odddomain.com name is CNAMEd before www.odddomain.com (or at the same time, if it is the first time the site is aliased to the CDN), the ghost server process will obtain the correct CNAME chain. Decoupling the hostname in this way easily allows for migration. The usage of a generic prefix proxy-host allows for seamless migration to a proxy CDN provider of multi-domain configurations.

In either the second party or third party migration case, the CNAME chain may provide metadata that needs to be passed to the origin upon a cache miss. Consider the following example:

proxy-host.images.example.com. IN CNAME c321.s21.cdn2.cpcloud.com.

images.example.com. IN CNAME c321.s21.cdn2.cpcloud.com.

c321.s21.cdn2.cpcloud.com. IN CNAME a8.cdn.cpcloud.com.

a8.cdn.cpcloud.com. IN CNAME a8.cdn.cpcloud.com.mdc.edgesuite.net.

a8.cdn.cpcloud.com.mdc.edgesuite.net. IN CNAME aX.s.akamaiedge.net.

where c321 is a container-token, s21 is a shard, and cdn2 is a zone.

In this example, assume it is desired to enable the edge server to have access to the CNAME chain so it can extract the metadata. Thus, in the MDC cache, a variable such as AK_MDC_DATA is configured as follows (and, once again, just as an example):

AK_MDC_DATA=proxy-host.images.example.com. c321.s21.cdn2.cpcloud.com. a8.cdn.cpcloud.com. a8.cdn.cpcloud.com.mdc.edgesuite.net.

The edge server may then extract metadata like this:
<match:regex string="%(AK_MDC_DATA)" regex=" (c\d+)\.(s\d+)\.(\s+)\.cpcloud" variable-list="TOKEN SHARD ZONE">
</match:regex>

As mentioned above, the CDN may operate edge servers in a cache hierarchy, where an edge ghost communicates with a parent server that also operates the web proxy process (ghost). Because (in this scenario) the edge ghost has already done the work to map the host header name to a configuration, it is not necessary to force any parent ghost to do the same. To avoid this, preferably the edge ghost sends (a cache hierarchy parent) the config_host name (and CNAME chain) in a header. The parent ghost then extracts the hostname and uses it in lieu of the value in the host header. A header of this type may be identified as X-Akamai-MDC-Data, as the following example illustrates:

X-Akamai-MDC-Data: proxy-host.Images.example.com. c321.s21.cdn2.cp cloud.com. a8.cdn.cpcloud.com. a8.cdn.cpcloud.com.mdc.edgesuite.net.

In operation, a parent ghost first looks-up the usual "Host:" header hostname in its host header configuration file and, if this fails, the parent tries to use the config_host extracted from the X-Akamai-MDC-Data header. If this operation fails, an HTTP 400 response code is issued.

As a skilled person will appreciate, the nature of the above-described MDC architecture enables options for a simple (but flexible) forward origin web resource binding solution and secure identity assertions using simple trust models. Web resource binding in metadata is enhanced in a decentralized scale by having dependency injection of the CDN customer's identity attributes, e.g., from the DNS record labels. The approach enables a robust trust model among actors (namely, CDN→CDN (intra-platform), CDN→Customer, and Customer→Third Party) in the MDC architecture by both managed naming conventions and secure tokens extracted from DNS record labels.

Without limitation, an initial configuration of the MDC module may be carried out by a customer using an extranet portal configuration manager. The configuration manager interacts with an "edge hostnames" (or CNAME) tool and a digital property database. As noted above, without MDC, edge configurations are decoupled from edge hostnames management via the notion of a digital property binding. When an edge configuration is bound to a digital property, the portal provisioning application encodes this binding both in the configuration file (arlindex) that is used by the edge server ghost process to attempt to match HTTP Host headers to configuration files. For MDC, preferably a specialized digital property type called the MDC Digital Property is introduced. The edge configuration file becomes MDC capable if a digital property bound to the configuration is an MDC type Digital Property. For a customer who has purchased this module, the customer portal may display an enhanced user interface for a "Multi-domain Digital Property" type.

In the simple scenario, a customer has one configuration and needs to support thousands of third party vanity CNAMEs through MDC. The configuration file, which may be pre-existing or new, is: prod-domains.customer.com.xml. When creating a multi-domain Digital Property type, preferably the Portal forms the MDC edge hostname in coordination with a CNAME provisioning tool by inserting an additional pre-defined labeled (forming the MDC prefix) between the CDN network domain name and the customer's Digital Property name:

domains.customer.com.mdc-<MDC-AUTHZ-TOKEN>.edgesuite.net

The secure hash in this token preferably uses invariant business identity attributes. The CNAME tool then creates a CNAME using this string. Once this is done, a configuration manager application associates the configuration file with the customer account and queues it up for network deployment (to the edge servers). The authorized edge hostname implements both of the CDN CDN (intra-platform) trust model and the CDN→Customer trust model (by our customer authoritatively mapping their digital property into our authorized edge hostname).

The ghost process trusts MDC entitlement via its control file, specifically the arlindex.xml. In this design alternative, instead of a hash in the edge hostname, Configuration Manager (through MUI) would set an attribute (flexible-host="yes") for the CNAME associated with this configuration file's arlindex.xml entry indicating the entitlement of the "multi-domain config" feature for it. Using the example names above, the arlindex.xml entry would look like:

<akamai:include type="arldata" file="cfg.customer.com.xml">
<host flexible-host="yes">customer.com.mdc.edgesuite.net</host>
</akamai:Include>

For the basic MDC customer, there may be constraints on the limits by which customer domains may be bound to each configuration file and how many origin domains to which the configuration can forward. For example, the configuration manager may allow for only one origin domain per configuration file. If desired, the customer can purchase more units of this module to support multiple origin domains, preferably each of which will have its own configuration file.

Preferably, all the customer (edge) hostnames associated with a configuration file should share the same metadata rules.

As noted above, preferably the CNAME tool may be invoked by the configuration manager for the purpose of creating the appropriate secure edge hostname. The tool should use the string passed to it by the configuration manager to create the CNAME to which all the customer's domains will map.

Preferably, the third party brand domains (cloud) or the multiple domains of of the CDN customer's brand should not CNAME directly to the CDN secure edge hostname because of the trust model.

The subject disclosure provides a robust edge server handling mechanism. As has been described, when a client request for a customer's domain gets mapped (by the CDN authoritative DNS) to a ghost process, that process first does a lookup (in its arlindex.xml) for a match on the host header. This lookup is presumed to fail. Ghost thens perform a DNS lookup on the received host header to check if this hostname resolves to a valid CDN service provider domain via an intermediate CNAME, such as one that ends with mdc.edgesuite.net. If it does not, ghost returns an error (an HTTP 400 code) and also negatively caches this hostname. This caching helps ghost respond faster (without requiring a DNS lookup) the next time it sees a request for this hostname. If the intermediate CNAME does have the expected suffix, ghost uses a returned CNAME (e.g., customer.com-.mdc.edgesuite.net) to lookup into arlindex.xml so as to arrive at the name of the desired configuration file (e.g., cfg.customer.com.xml). As a further check ghost may verify that an internal flexible-host="yes" attribute is set for the CNAME before using this file for metadata application. In this case, ghost caches the "hostname to configuration file" mapping for faster responses in the future. The ghost process can derive the name of the metadata configuration file using the intermediate CNAME because the configuration manager has established a file-naming convention and enforced it through a CNAME provisioning tool. If the DNS lookup times out, ghost should neither positively nor negatively cache this hostname, but just serve an error. The rest of the ghost request processing follows as usual.

Although not required, preferably ghost uses a separate processing thread to carry out the DNS lookup required. This thread may be rate-limited, which is beneficial in the event a denial of service (DoS) attack has been launched (by making requests using a large number of invalid hostnames) to exploit this additional lookup. The negative caching of bad hostnames and positive caching of good ones is also beneficial in this regard.

As illustrated above, preferably the intermediate CNAME ends with a special agreed-upon suffix (mdc.edgesuite.net) for multi-domain customers.

In a representative implementation, the subject functionality is implemented in software, as computer program instructions executed by a processor.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines. The functionality may be provided as a service, e.g., as a SaaS solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject disclosure also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. While given components of the system have been described separately, one of ordinary skill will appreciate that some of the functions may be combined or shared in given instructions, program sequences, code portions, and the like.

Preferably, the functionality is implemented in an application layer solution, although this is not a limitation, as portions of the identified functions may be built into an operating system or the like.

The functionality may be implemented with other application layer protocols besides HTTP, such as HTTPS, or any other protocol having similar operating characteristics.

There is no limitation on the type of computing entity that may implement the client-side or server-side of the connection. Any computing entity (system, machine, device, program, process, utility, or the like) may act as the client or the server.

What is claimed is as follows:

1. A computer program product in a non-transitory computer-readable medium comprising computer program instructions executable in one or more hardware processors, the computer program instructions comprising:

a network-accessible provisioning portal operated by a first party, the provisioning portal receiving data, the data having been entered by a second party customer of the first party to provision, for handling by the first party, a digital property that is associated with a set of third party domain names, the third party domain names being associated with one or more third party customers of the second party that are not customers of the first party;

a set of edge server processes operated by the first party as an overlay network, wherein an edge server process receives from the provisioning portal a multi-party identity assertion;

at least one edge server process being configured to receive a request, determine whether the request is associated with a second party domain that is recognized, and to locate a configuration associated with the digital property using the multi-party identity assertion when the request associated with the second party domain is not recognized, wherein the request associated with the second party domain is not recognized because the request is associated with given third party content of a particular one of the third party customers; and wherein the at least one edge server process is further configured to deliver the given third party content, wherein the delivery is associated with and accounted to the second party even though the particular third party customer is not a customer of the first party.

2. The computer program product as described in claim 1 wherein the edge server process is further configured to apply at least one content handling directive in the configuration file to a request for the given third party content prior to delivery of the given third party content.

3. The computer program product as described in claim 1 wherein the first party is a content delivery network (CDN) service provider, the second party is a service provider other than the CDN service provider, the content delivery network service provider providing the second party a handling function using the digital property as a service offering, the handling function enabling the second party to use delivery services provided by the first party while also enabling the first party to capture and account for data representing third party customer traffic delivered using the third party domain names.

4. The computer program product as described in claim 1 wherein the multi-party identity assertion is a Canonical Name (CNAME) chain.

5. The computer program product as described in claim 1 wherein access to the provisioning portal is over a secure communication link.

6. The computer program product as described in claim 4 wherein the edge server process is further configured to determine whether a predetermined pattern associated with a canonical name in the multi-party identity assertion includes a prefix value, the canonical name being returned to the edge server process in response to a domain name query on the second party domain.

7. The computer program product as described in claim 1 wherein a determination whether the request is associated with a second party domain is associated with a Domain Name Service (DNS) lookup that executes in a separate processing thread in the edge server.

8. The computer program product as described in claim 7 wherein the separate processing thread is rate-limited.

* * * * *